(12) United States Patent
Hundley et al.

(10) Patent No.: US 11,857,115 B1
(45) Date of Patent: Jan. 2, 2024

(54) COOKWARE HANDLE

(71) Applicant: The Vollrath Company, L.L.C., Sheboygan, WI (US)

(72) Inventors: Jill Hundley, Sheboygan, WI (US); Carl Neess, Pardeeville, WI (US); Steve Vollmer, Sheboygan, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 0 days.

(21) Appl. No.: 18/080,979

(22) Filed: Dec. 14, 2022

(51) Int. Cl.
*A47J 45/07* (2006.01)
*A47J 45/08* (2006.01)
*B25G 3/00* (2006.01)
*B65D 25/28* (2006.01)
*A47J 45/06* (2006.01)
*A47J 27/00* (2006.01)

(52) U.S. Cl.
CPC ....... *A47J 45/061* (2013.01); *A47G 2200/046* (2013.01); *A47J 27/002* (2013.01); *A47J 45/071* (2013.01); *A47J 45/085* (2013.01); *Y10S 16/12* (2013.01); *Y10T 74/20876* (2015.01)

(58) Field of Classification Search
CPC . A47G 2200/046; A47J 27/002; A47J 45/061; A47J 45/08; A47J 45/085; A47J 45/10; A47J 45/071; B25G 3/26; B25G 3/00; Y10S 16/12; Y10S 16/10; Y10S 16/40; Y10T 74/20876; Y10T 74/20738
USPC .......... 15/145; 16/422, 425, DIG. 2; 30/299, 30/122, 329, 340; 74/543, 558.5; 220/753, 755, 759, 573.1; D7/361, 395
See application file for complete search history.

(56) References Cited

U.S. PATENT DOCUMENTS

| 1,487,749 | A | * | 3/1924 | Martus | A47J 45/10 16/431 |
| 1,712,675 | A | * | 5/1929 | Olsen | A47J 45/10 220/753 |
| 1,965,354 | A | * | 7/1934 | Patock | A47J 45/10 220/759 |
| 2,133,252 | A | * | 10/1938 | Moore | A47J 45/071 220/759 |

(Continued)

FOREIGN PATENT DOCUMENTS

| CA | 2248830 A1 | 4/1999 |
| GB | 0 422 254 A | 1/1935 |

(Continued)

OTHER PUBLICATIONS

International Search Report and Written Opinion for PCT/US2023/011220 dated Oct. 10, 2023.

*Primary Examiner* — Gideon R Weinerth
(74) *Attorney, Agent, or Firm* — Foley & Lardner LLP

(57) ABSTRACT

A cookware handle includes a grip comprising a first side, a second side, a pocket between the first side and the second side, a first aperture in the first side, and a second aperture in the second side. The cookware handle also includes a shaft comprising a proximal end configured to be coupled to cookware, a distal portion positioned in the pocket, and a third aperture aligned with the first aperture and the second aperture. The cookware handle also includes a plug including a ribbed thumb grip aligned with a surface of the first side of the grip. The plug retains the grip on the shaft by filling the first aperture, the second aperture, and the third aperture.

20 Claims, 13 Drawing Sheets

(56) References Cited

U.S. PATENT DOCUMENTS

| | | | |
|---|---|---|---|
| 2,231,222 A * | 2/1941 | Rosenheimer, Jr. | A47J 45/08 |
| | | | D7/395 |
| 2,619,672 A * | 12/1952 | Glaser | A47J 45/10 |
| | | | 16/431 |
| D177,623 S | 5/1956 | Hvale | |
| 2,746,143 A | 5/1956 | Maine | |
| D199,799 S | 2/1964 | Rowley | |
| D200,489 S | 3/1965 | Munson et al. | |
| 3,271,856 A | 9/1966 | Rowley | |
| 4,197,611 A * | 4/1980 | Bell | A47J 45/08 |
| | | | 220/753 |
| 4,209,877 A * | 7/1980 | Colasent | A47J 45/08 |
| | | | 220/753 |
| D258,861 S * | 4/1981 | Bratton | D7/395 |
| 4,512,381 A * | 4/1985 | Alvarez | B25G 3/26 |
| | | | 30/340 |
| 5,299,475 A * | 4/1994 | Stroop | B25G 3/34 |
| | | | 81/20 |
| 5,581,845 A | 12/1996 | Yang | |
| 5,867,867 A * | 2/1999 | Kessler | A47J 45/061 |
| | | | 220/753 |
| 5,926,911 A | 7/1999 | Chen | |
| 6,003,188 A | 12/1999 | Henry et al. | |
| 6,131,290 A | 10/2000 | Chiou | |
| 6,295,902 B1 | 10/2001 | Lin | |
| 6,325,238 B1 * | 12/2001 | Munari | A47J 45/06 |
| | | | 220/759 |
| 6,367,854 B1 * | 4/2002 | Chou | B25G 1/01 |
| | | | 81/463 |
| 6,386,070 B1 | 5/2002 | Hong | |
| 6,439,421 B1 * | 8/2002 | Lin | A47J 45/071 |
| | | | 220/759 |
| D478,470 S * | 8/2003 | Van De Venter, Jr. | D7/395 |
| 6,619,408 B1 | 9/2003 | Lai | |
| 6,754,936 B2 | 6/2004 | Erenaga | |
| D498,117 S | 11/2004 | Lorthioir | |
| D500,925 S | 1/2005 | Hay et al. | |
| 7,047,591 B2 * | 5/2006 | Hohlbein | A46B 5/026 |
| | | | 16/DIG. 19 |
| 7,174,605 B1 * | 2/2007 | Nawrocki | A45C 13/28 |
| | | | 16/428 |
| D545,115 S * | 6/2007 | Wasserman | D7/354 |
| D564,294 S * | 3/2008 | Wasserman | D7/395 |
| 7,410,076 B2 * | 8/2008 | Borhofen | A47J 45/10 |
| | | | 220/753 |
| D575,983 S | 9/2008 | Giannone | |
| 7,611,179 B2 | 11/2009 | Lorthioir et al. | |
| D617,140 S * | 6/2010 | Rae | D7/395 |
| 8,573,438 B1 * | 11/2013 | Cheng | A47J 45/071 |
| | | | 220/759 |
| 8,814,554 B2 | 8/2014 | Legreve et al. | |
| D721,913 S * | 2/2015 | Hoobler | D7/395 |
| 9,072,408 B2 | 7/2015 | Baumgarten et al. | |
| D805,346 S * | 12/2017 | Ryan | D7/395 |
| 10,807,261 B2 * | 10/2020 | Zaremba | B26B 21/4062 |
| 10,912,421 B2 * | 2/2021 | Barrie | A47J 45/10 |
| 11,253,986 B2 | 2/2022 | Yu | |
| 2002/0144409 A1 * | 10/2002 | Chen | B26B 5/00 |
| | | | 30/329 |
| 2004/0239130 A1 | 12/2004 | Heuel et al. | |
| 2006/0096996 A1 * | 5/2006 | Lorthioir | A47J 45/10 |
| | | | 220/759 |
| 2006/0213033 A1 * | 9/2006 | Wasserman | A47J 45/061 |
| | | | 16/431 |
| 2006/0237470 A1 * | 10/2006 | Zanner | A47J 45/085 |
| | | | 220/752 |
| 2007/0138191 A1 * | 6/2007 | LeGreve | A47J 45/061 |
| | | | 220/755 |
| 2009/0083944 A1 * | 4/2009 | Pasquini | A47J 45/061 |
| | | | 16/421 |
| 2009/0084803 A1 * | 4/2009 | Pasquini | A47J 45/08 |
| | | | 220/753 |
| 2011/0094062 A1 * | 4/2011 | Pasquini | A47J 45/071 |
| | | | 16/430 |
| 2011/0167643 A1 * | 7/2011 | Chen | B26B 5/00 |
| | | | 30/344 |
| 2012/0159794 A1 * | 6/2012 | Vogel | A47G 21/02 |
| | | | 30/340 |
| 2020/0230799 A1 * | 7/2020 | Brown | A47J 45/071 |

FOREIGN PATENT DOCUMENTS

| | | |
|---|---|---|
| KR | 101368376 B1 | 2/2014 |
| WO | WO-2019/040777 A1 | 2/2019 |

* cited by examiner

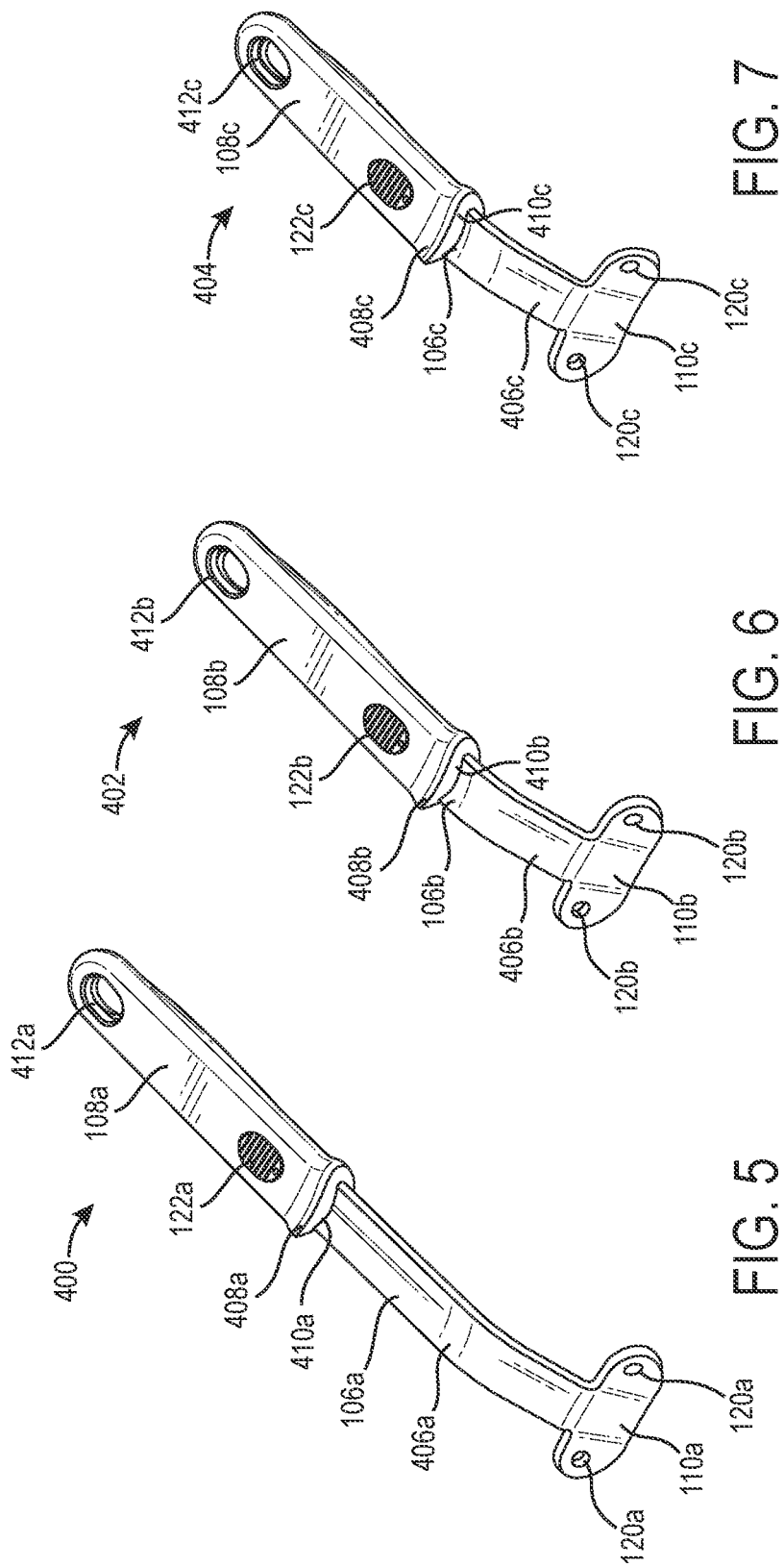

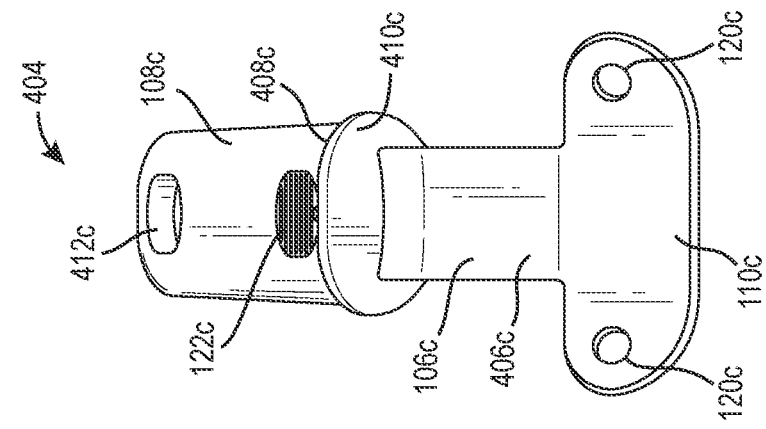
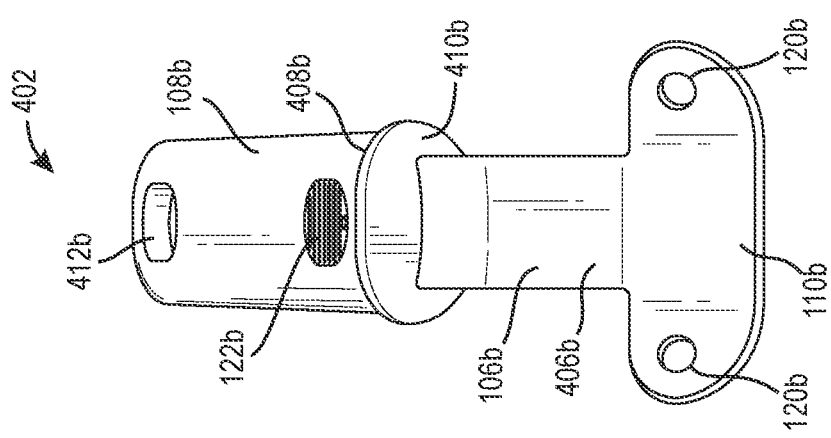
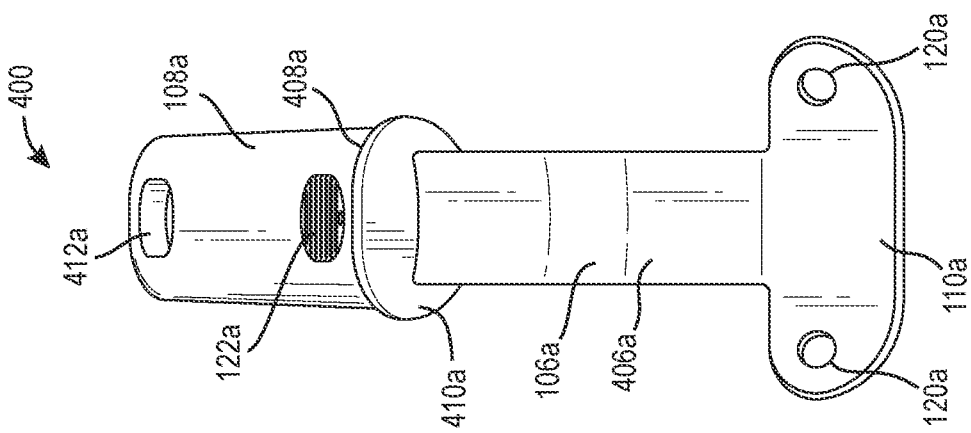

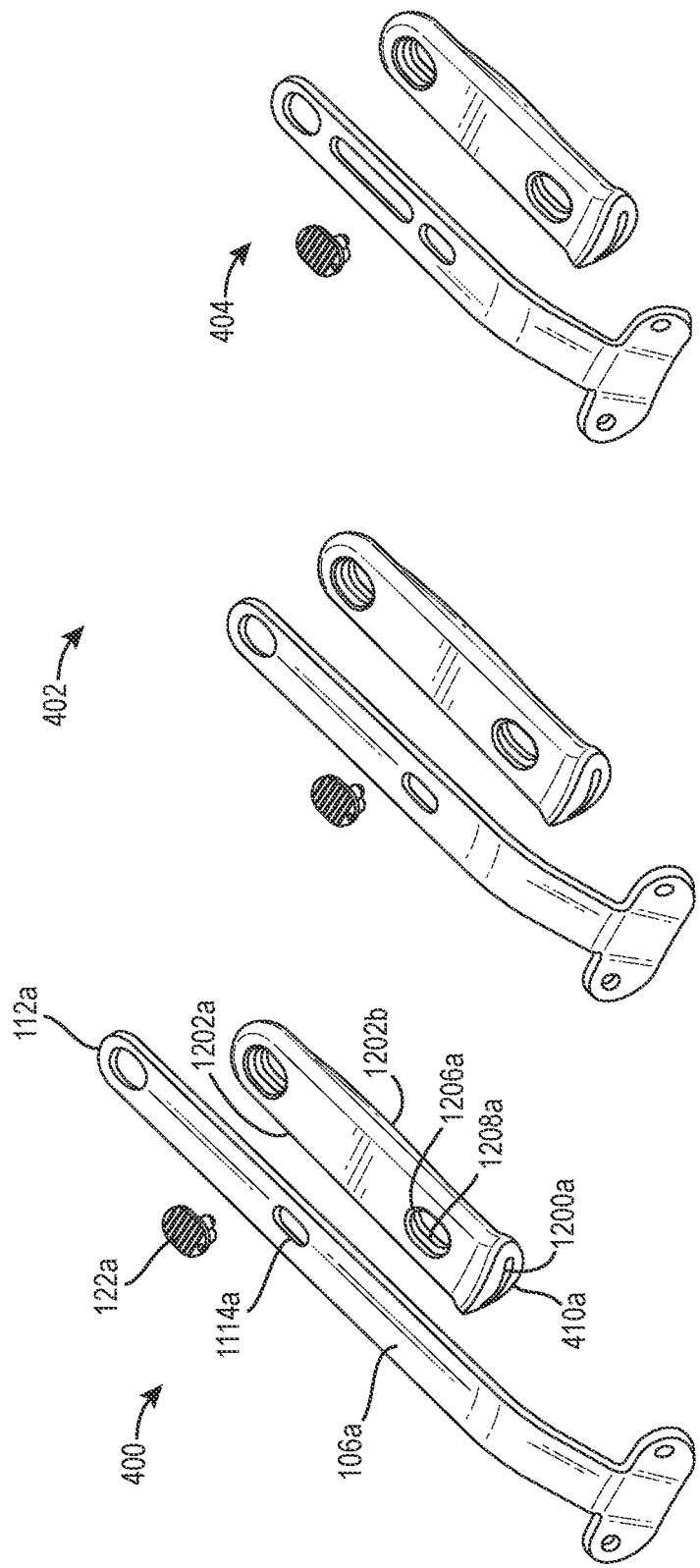

COOKWARE HANDLE

BACKGROUND

The present disclosure relates generally to handles for cookware, for example handles for pots, pans, skillet, griddle, etc. Providing easy-to-assemble cookware handles can be challenging.

SUMMARY

One implementation of the present disclosure is a cookware handle. The cookware handle includes a grip having a first side, a second side, a pocket between the first side and the second side, a first aperture in the first side, and a second aperture in the second side. The cookware handle also includes a shaft having a proximal end configured to be coupled to cookware, a distal portion positioned in the pocket, and a third aperture aligned with the first aperture and the second aperture. The cookware handle also includes a plug including a ribbed thumb grip aligned with a surface of the first side of the grip. The plug retains the grip on the shaft by filling the first aperture, the second aperture, and the third aperture.

Another implementation of the present disclosure is cookware. The cookware includes a pot or pan, and a handle coupled to the pot or pan. The handle includes a grip including a first side, a second side, a pocket between the first side and the second side, a first aperture in the first side, and a second aperture in the second side. The handle also includes a shaft comprising a proximal end at which the pot or pan is coupled to the shaft, a distal portion positioned in the pocket, and a third aperture aligned with the first aperture and the second aperture. The handle also includes a plug comprising a ribbed thumb grip aligned with a surface of the first side of the grip. The plug retains the grip on the shaft by filling the first aperture, the second aperture, and the third aperture.

Another implementation of the present disclosure is a method. The method includes providing a pot or pan, coupling the pot or pan to a shaft at a proximal end of the shaft, positioning a distal end of the shaft in a grip while aligning a first aperture in a first side of the grip and a second aperture in a second side of the grip with a third aperture in the shaft, and inserting a plug into the first aperture, the second aperture, and the third aperture such that the plug retains the grip on the shaft and a ribbed thumb grip of the plug is aligned with a surface of the first side of the grip.

BRIEF DESCRIPTION OF THE FIGURES

The disclosure will become more fully understood from the following detailed description, taken in conjunction with the accompanying figures, wherein like reference numerals refer to like elements, in which:

FIG. 5 is a perspective view of a cookware handle, according to some embodiments.

FIG. 6 is another perspective view of a cookware handle, according to some embodiments.

FIG. 7 is another perspective view of a cookware handle, according to some embodiments.

FIG. 8 is a front view of a cookware handle, according to some embodiments.

FIG. 9 is another front view of a cookware handle, according to some embodiments.

FIG. 10 is another front view of a cookware handle, according to some embodiments.

FIG. 12 is an exploded view of a cookware handle, according to some embodiments.

FIG. 13 is another exploded view of a cookware handle, according to some embodiments.

FIG. 14 is another exploded view of a cookware handle, according to some embodiments.

DETAILED DESCRIPTION

Figure 1:
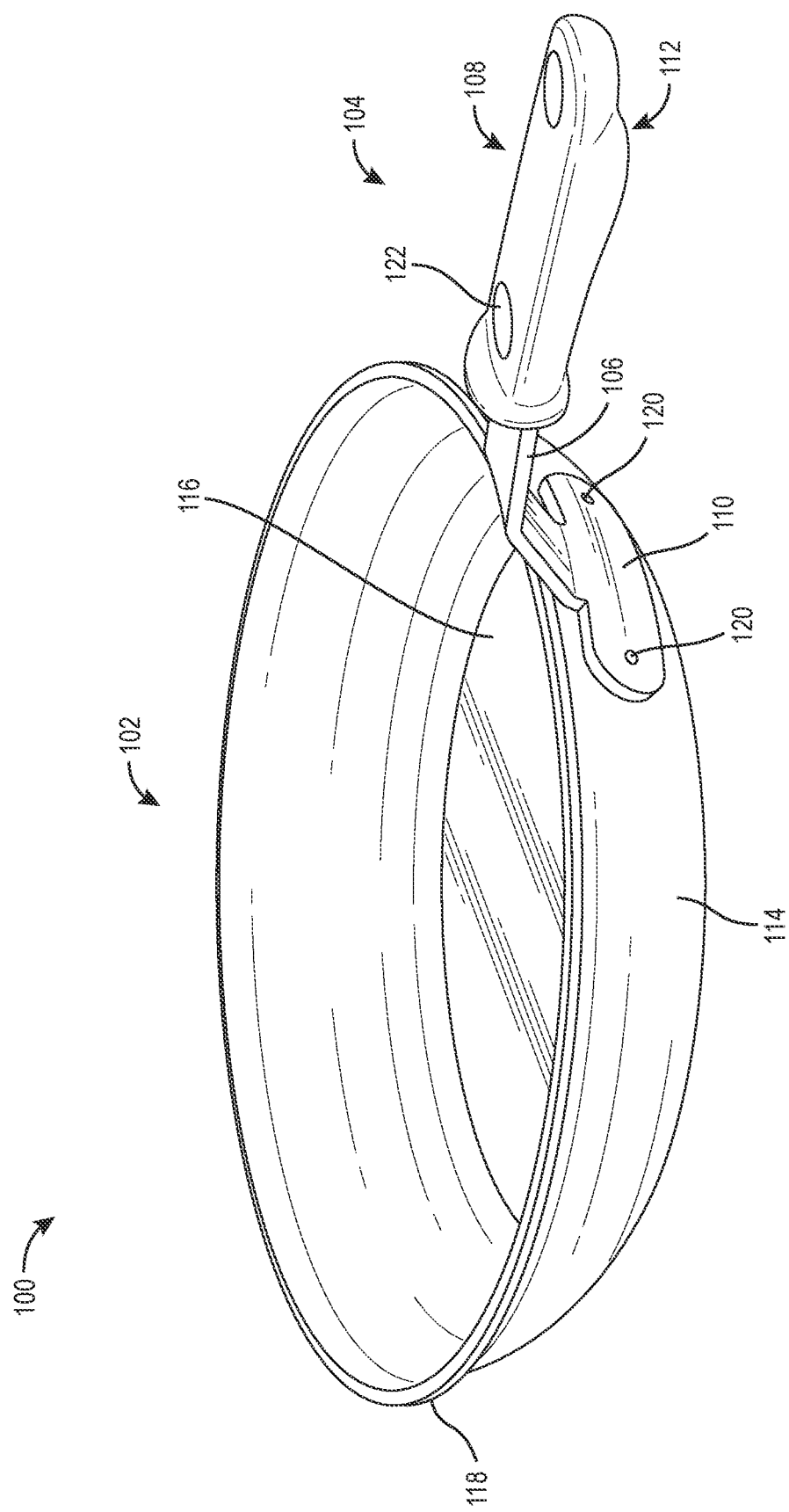
FIG. 1 is a perspective view of cookware, according to some embodiments.
Figure 2:
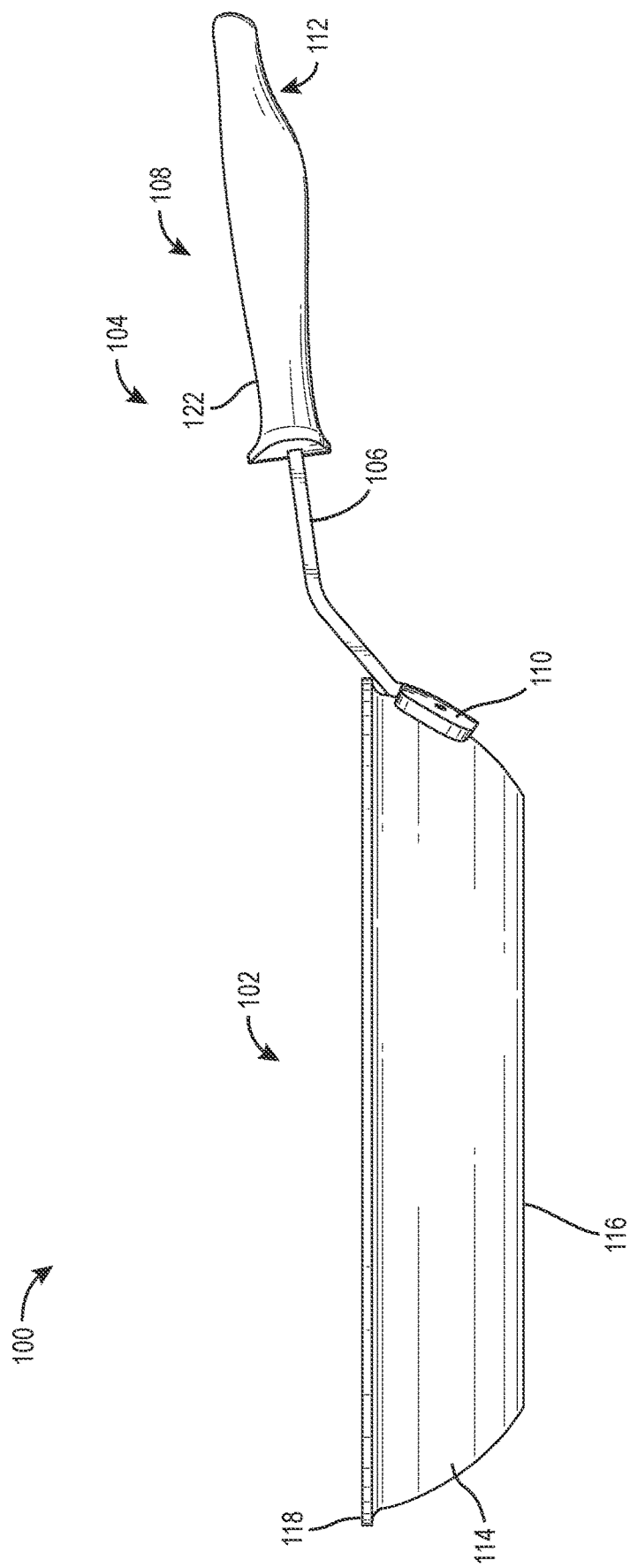
FIG. 2 is side view of cookware, according to some embodiments.
Figure 3:
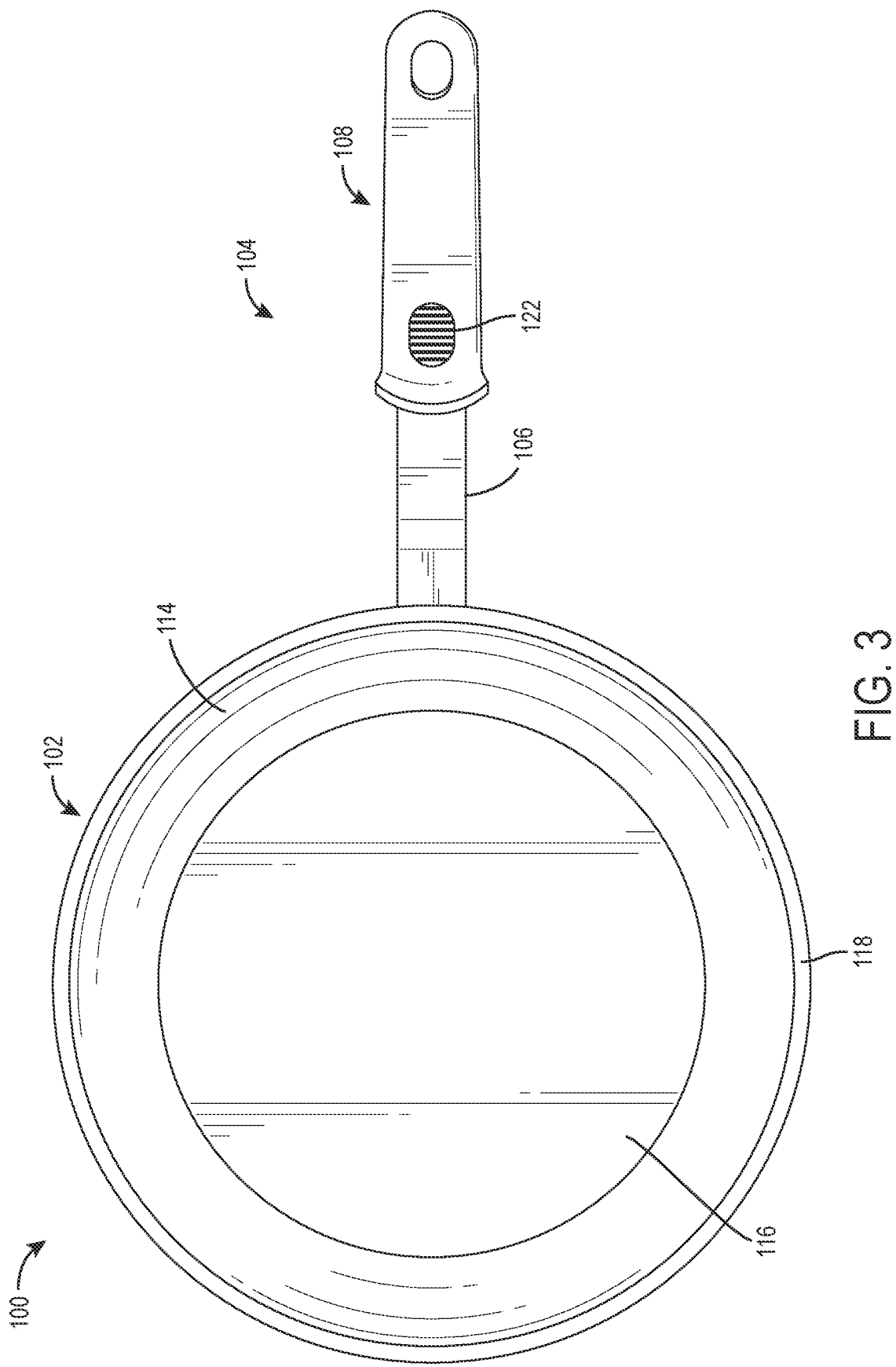
FIG. 3 is a top view of cookware, according to some embodiments.

Referring now to FIGS. 1-3, views of cookware 100 are shown, according to some embodiments. The cookware 100 is shown as including a pan 102 and a handle 104 coupled to the pan 102. The handle 104 includes a shaft 106 and a grip 108 coupled to the shaft 106. The shaft 106 includes a proximal end 110 mating with, adjacent, etc. the cookware 100 with an opposite, distal end 112 of the shaft 106 received in the grip 108.

As shown in FIGS. 1-3, the cookware 100 includes the pan (e.g., frying pan) 102. In other embodiments, the cookware 100 can include any type of pan, pot, skillet, griddle, other cooking vessel, etc. The pan 102 is configured for cooking of food, for example by placing the food in the pan 102 and placing the cookware 100 (i.e., the pan 102) on a cooktop, stovetop, grill, or other heat or energy source. In some embodiments, the pan 102 is made of an inductive material such that the cookware 100 is adapted for use with an induction cooktop.

As shown, the pan 102 includes a curved wall 114 extending upwards from a base surface 116 to a lip 118. The proximal end 110 of the shaft 106 is curved to match a contour of the curved wall 114 of the pan 102 such that the proximal end 110 of the shaft 106 facilitates coupling of the shaft 106 to the pan 102 at the curved wall 114. In the example shown, the proximal end 110 of the shaft 106 includes wings, fins, tabs, extensions, widening, etc. which provides an increased surface area (relative to the shaft 106 at other areas of the shaft 106) for attachment between the curved wall 114 and the shaft 106. The proximal end 110 of the shaft 106 is further shown as including holes 120, which can accommodate rivets, bolts, or other fasteners coupling the shaft 106 to the pan 102. Additionally or alternatively, welding, adhesive, etc. may be used to couple the shaft 106 to the pan 102. In some embodiments, the shaft and the pan 102 are integrally formed (e.g., cast as a unitary structure).

The handle 104 is thereby configured to enable a user to manipulate (e.g., pick up, move, turn, etc.) the pan 102. The handle 104 can be made of material(s) that provide thermal insulation between the hand of user holding the grip 108 and the pan 102.

The cookware 100 further includes a plug 122 extending at partially through the shaft 106 and the grip 108 to secure the grip 108 on the shaft 106, as described in further detail below. As illustrated in FIGS. 1-3, the plug 122 includes a ribbed surface providing a thumb grip (e.g., increasing contact area, friction, etc. between the grip 108 and a user's thumb when the user is holding the grip 108) which facilitates manipulation of the cookware 100. Various views, embodiments, elements, etc. of the handle 104 are shown in FIGS. 4-22 and described in detail in the following passages.

Figure 4:
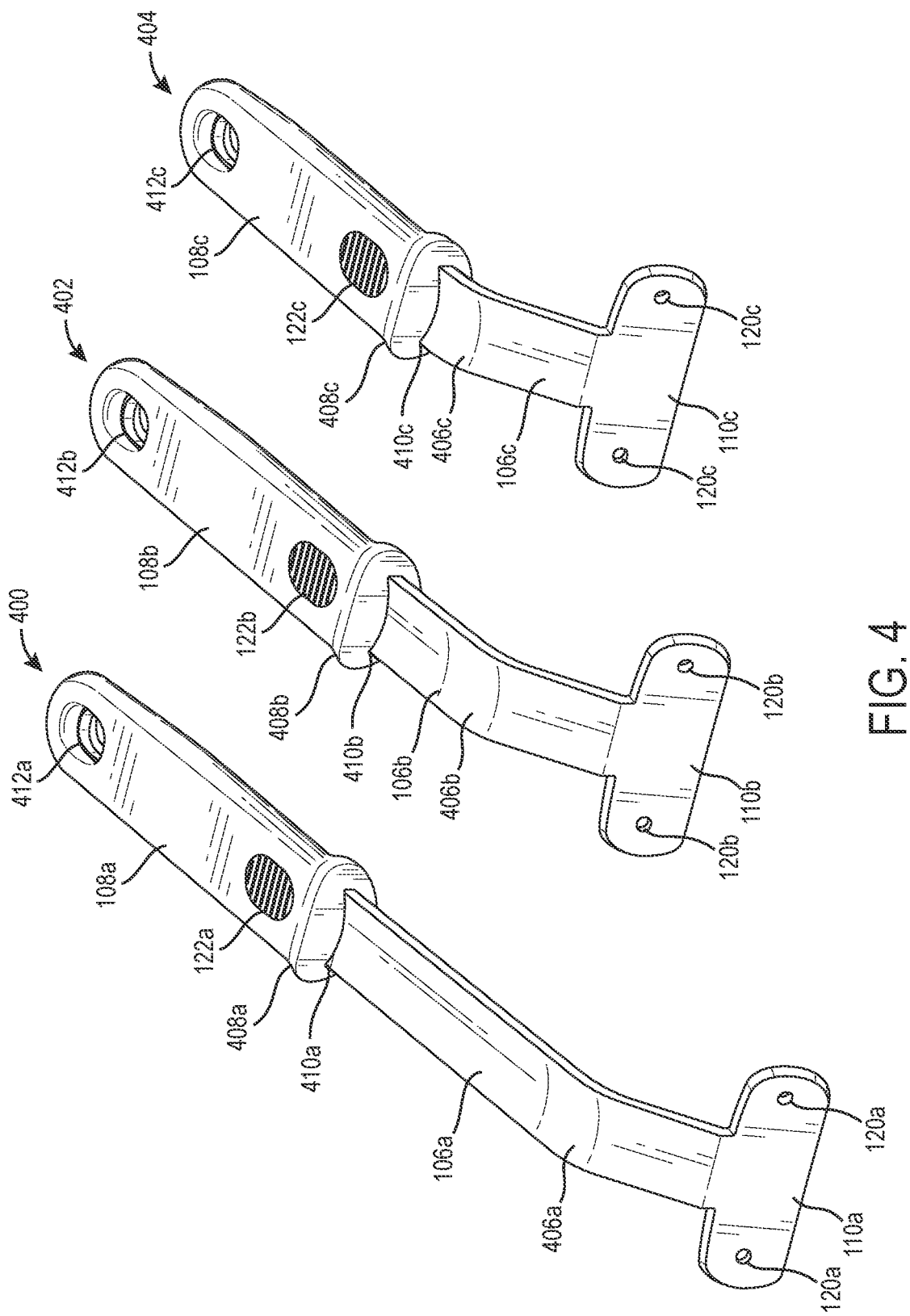
FIG. 4 is a perspective use of cookware handles, according to some embodiments.

Referring now to FIGS. 4-10, views of a first handle 400, a second handle 402, and a third handle 404 are shown, according to some embodiments. The handle 104 can be any of the first handle 400, the second handle 402, or the third handle 404 in various embodiments, for example based on the first handle 400, the second handle 402, and the third handle 404 share many common features and differ primarily with respect to dimensions of various components thereof. The following description is applicable to each of the first handle 400, second handle 402, and third handle 404, with differences noted below. FIG. 4 shows perspective vies of the first handle 400, the second handle 402, and the third handle 404, FIG. 5 shows another perspective view of the first handle 400, FIG. 6 shows another perspective view of the second handle 402, FIG. 7 shows another perspective view of the third handle 404, FIG. 8 shows a front view of the first handle 400, FIG. 9 shows a front view of the second handle 402, and FIG. 10 shows a front view of the third handle 404.

FIGS. 4-10 show the first handle 400 as including a shaft 106a, a grip 108a, and a plug 122a, show the second handle 402 as including a shaft 106b, a grip 108b, and a plug 122b, and the third handle 404 as including a shaft 106a, a grip 108b, and a plug 122c. As shown in FIGS. 4-10, the shaft 106a of the first handle 400 is longer than the shaft 106b of the second handle 402, and the shaft 106b of the second handle 402 is longer than the shaft 106c of the third handle 404. As shown, the grip 108a of the first handle 400 and the grip 108b of the second handle 402 have substantially the same dimensions while the grip 108c is smaller (e.g., shorter in length) than the grips 108a,b.

The shafts 106a,b,c are illustrated has including corners (bends, curves, etc.) 406a,b,c between proximal ends 110a, b,c of the shafts 106a,b,c and the grips 108a,b,c. The corners 406a,b,c can be provided as curves having various radii in various embodiments. A proximal end 110a,b,c of the shafts 106a,b,c may be substantially flat (straight, planar, etc.). The curves 406a,b,c enable the shafts 106a,b,c and the grips 108a,b,c to extend away from a pot, pan, etc. (e.g., pan 102 as illustrated in FIG. 1) while the proximal ends 110a,b,c of the shafts 106a,b,c and the holes 120a,b,c therein are suitably oriented for coupling of the shafts 106a,b,c to a pot, pan, etc. (e.g., as shown in FIG. 1).

The grips 108a,b,c are shown as including flared ends 408a,b,c. The flared ends 408a,b,c define proximal ends of the grips 108a,b,c (i.e., ends closest to the proximal ends 110a,b,c of the shafts 106a,b,c. The flared ends 408a,b,c flare to a width greater than neighboring portions of the grips 108a,b,c, for example to constrain a user's hand from sliding along and off of one of the grips 108a,b,c towards the proximal end 110a,b,c of the correspond shaft 106a,b,c and the pot/pan/etc. coupled thereto. Each flared end 408a,b,c is shown as providing a face 410a,b,c facing the proximal ends 110a,b,c, with the face 410a,b,c substantially perpendicular to the shaft 106a,b,c at the flared end 408a,b,c. The faces 410a,b,c may be curved or planar in various embodiments. The shafts 106a,b,c extended both into and from the grips 108a,b,c from the faces 410a,b,c.

Each handle 104a,b,c is also illustrated as including an open channel 412a,b,c extending through the grip 108a,b,c and the shaft 106a,b,c. (e.g., formed by holes, passages, channels, etc. through the shaft 106a,b,c and through sides of the grip 108a,b,c on either side of the shaft 106a,b,c). The open channels 412a,b,c can facilitate hanging of the handles 104a,b,c, on hooks, carabineers, wires, ropes, etc., for example facilitating storage of cookware including one of the handles 104a,b,c when not in use. The open channels 412a,b,c are shown as having oval perimeters. Other shapes can be used in other embodiments.

Figure 11:
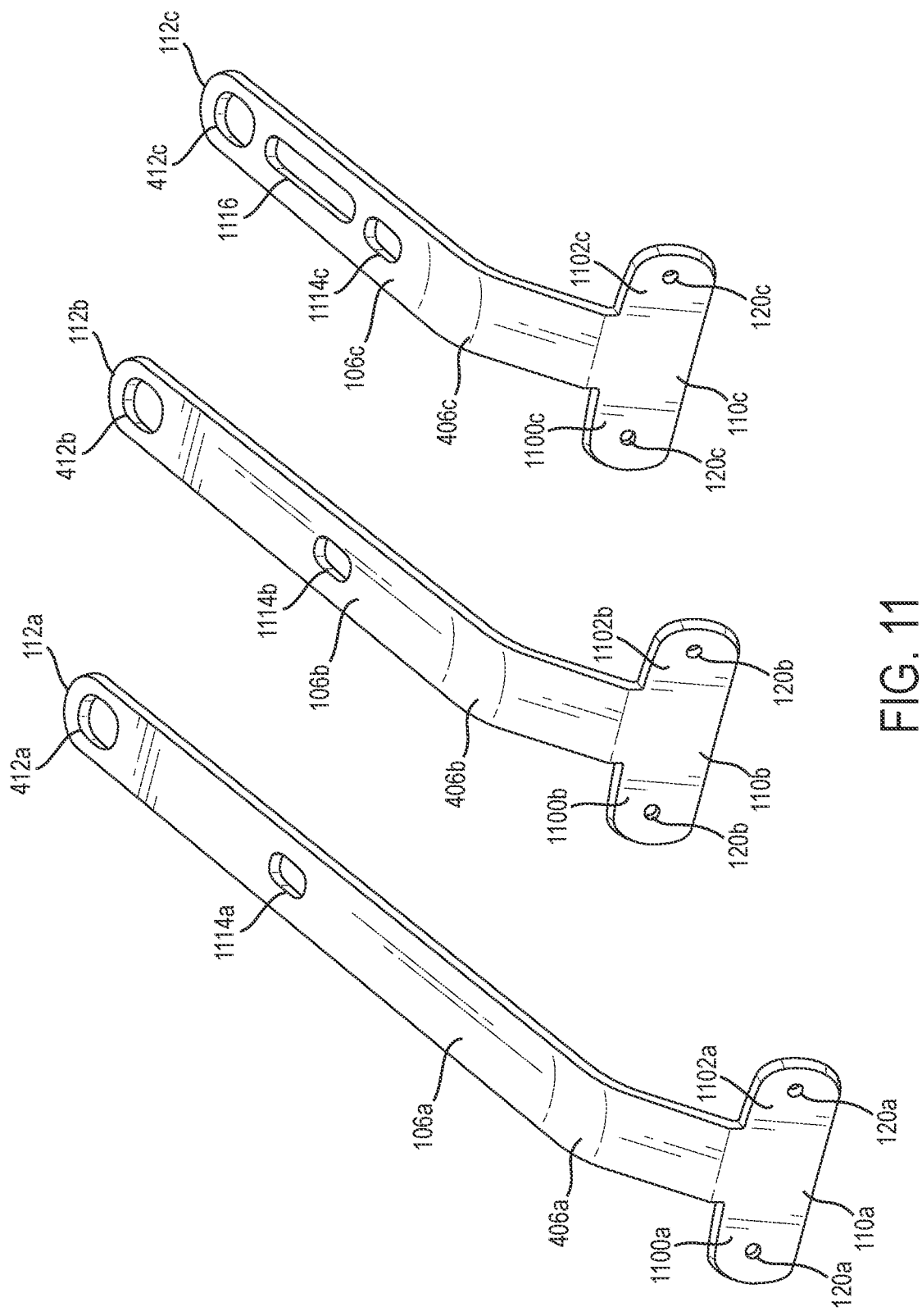
FIG. 11 is a perspective view of shafts of cookware handles, according to some embodiments.

Referring now to FIG. 11, perspective views of the first shaft 106a, the second shaft 106b, and the third shaft 106c are shown, according to some embodiments. The shafts 106a,b,c include proximal ends 110a,b,c, distal ends 112a, b,c opposite the proximal ends 110a,b,c, corners 406a,b,c between the proximal ends 110a,b,c and the distal ends 112a,b,c, and open channels 412a,b,c proximate the distal ends 112a,b,c. The shafts 106a,b,c are shown as being substantially planar except at the corners 406a,b,c, and may have a curved, arched, etc. cross-section in other embodiments.

Each proximal end 110a,b,c is winged, widened, etc., with each proximal end 110a,b,c illustrated as including a first wing 1100a,b,c and a second wing 1102a,b,c symmetric with the first wing 1100a,b,c across a longitudinal axis of the shaft 106a,b,c. The first wing 1100a,b,c and the second wing 1102a,b,c include holes 120a,b,c configured to receive rivets, bolts, other fasteners, etc. coupling the proximal end 110a,b,c to a pot, pan, or other cooking vessel (e.g., as in FIG. 1).

The shafts 106a,b,c are shown as including apertures (channels, openings, windows, holes, etc.) 1114a,b,c, with each aperture 1114a,b,c extending through the corresponding shaft 106a,b,c and positioned between the distal end 112a,b,c and the corner 406a,b,c (between the open channels 412a,b,c and the corners 406a,b,c. The apertures 1114a,b,c are show as oval-shaped, and can be other shapes in some embodiments (e.g., circular, triangular, rectangular, pentagonal, hexagonal, etc.). The apertures 1114a,b,c are configured to receive the plugs 122a,b,c as described in further detail below.

The shaft 106c of the third handle 104c is further shown as including an open section 1116. The open section 1116 is provided along the shaft 106c between the aperture 1114c and the open channels 412a,b,c. The open section 1116 is provided to reduce the weight of the third handle 104c, for example to improve balance and feel of the third handle 104c to a user. In other embodiments, the open section 1116 is replaced or filled with a material having a higher density than a material of the shaft 106c to increase a weight of the shaft as may be desirable to improve a user's experience in handling the third handle 104c.

Figure 15:
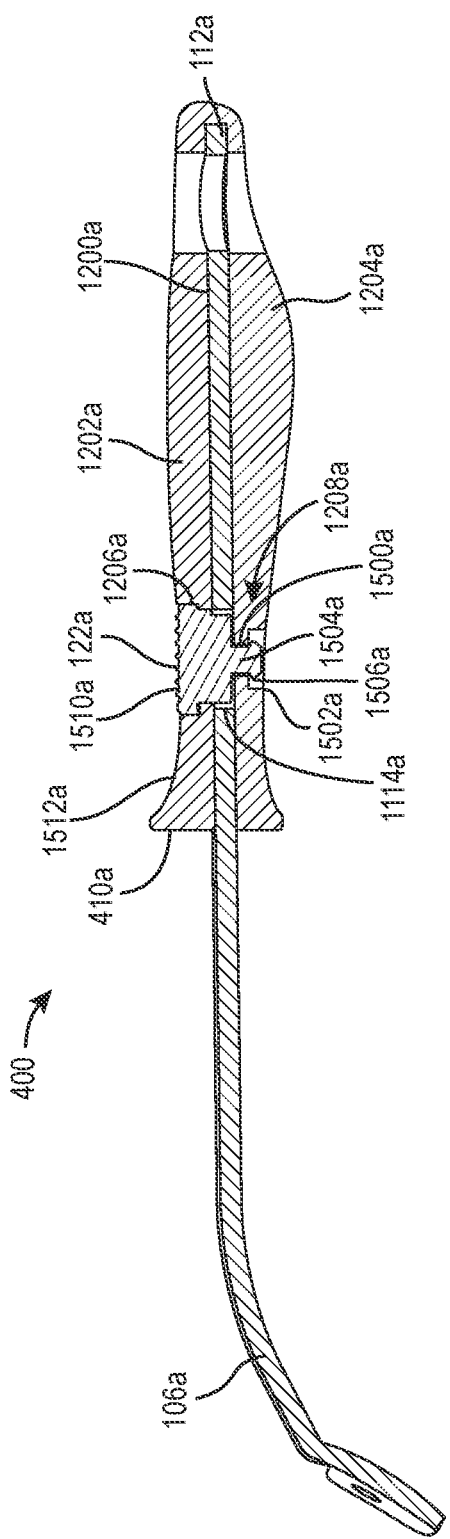
FIG. 15 is a cut-away side view of a cookware handle, according to some embodiments.
Figure 16:
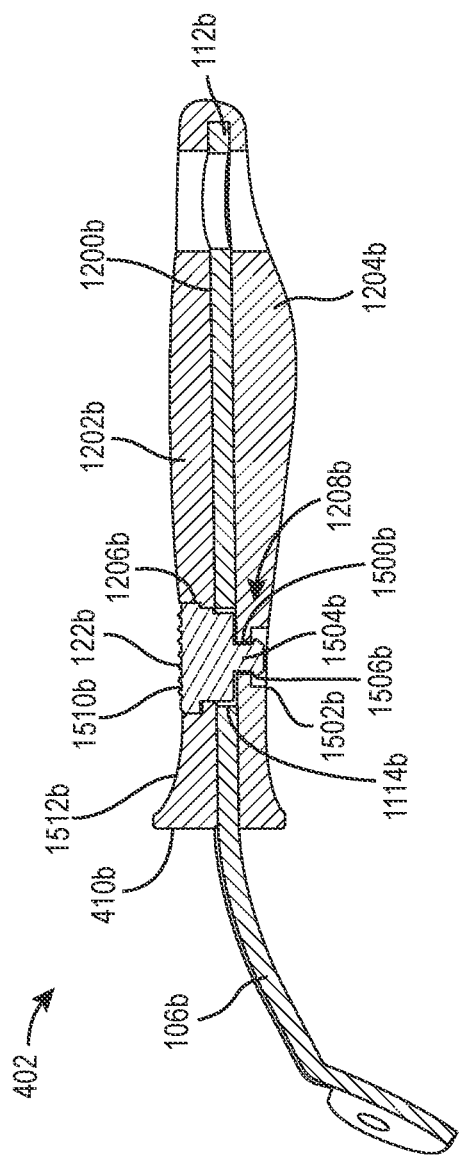
FIG. 16 is another cut-away side view of a cookware handle, according to some embodiments.
Figure 17:
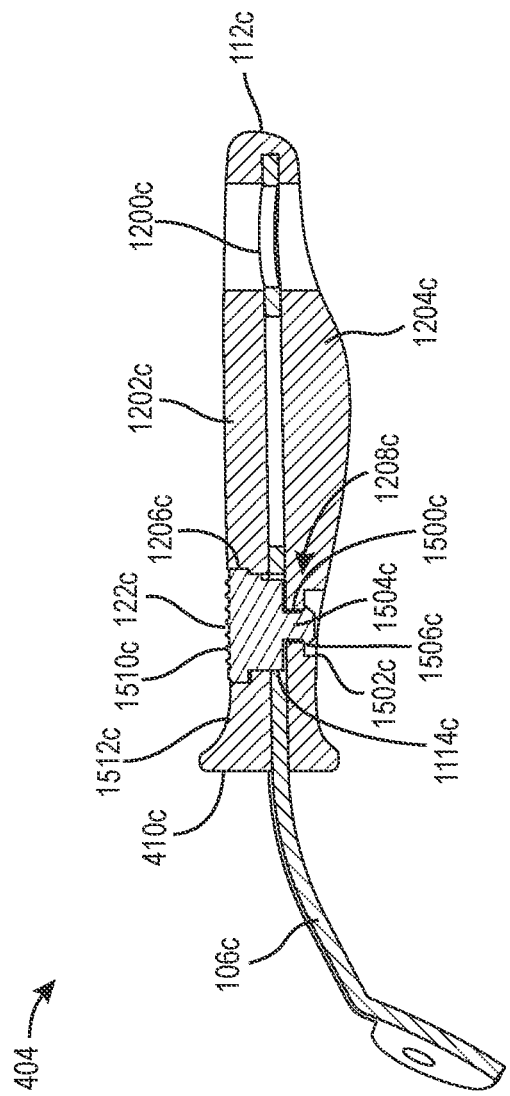
FIG. 17 is another cut-away side view of a cookware handle, according to some embodiments.

Referring now to FIGS. 12-17, exploded (or disassembled) and cut-away views of the handles 104a,b,c are shown, according to some embodiments. FIG. 12 shows an exploded view of the first handle 104a, FIG. 13 shows an exploded view of the second handle 104b, and FIG. 14 shows an exploded view of the third handle 104c. FIG. 15 shows a cut-away side view of the first handle 104a, FIG. 16 shows a cut-away side view of the second handle 104b, and FIG. 17 shows a cut-away side view of the third handle 104c.

FIGS. 12-17 illustrate that each of the grips 108a,b,c includes a pocket 1200a,b,c formed between a first side 1202a,b,c of the grip 108a,b,c and a second side 1204a,b,c of the grip 108a,b,c. The pockets 1200a,b,c are sized to receive the corresponding shafts 106a,b,c so that the distal ends 112a,b,c of the shafts 106a,b,c are position in the pockets 1200a,b,c, i.e., between the first sides 1202a,b,c and the second sides 1204a,b,c of the grip 108a,b,c. The pockets 1200a,b,c are open at the faces 410a,b,c to allow the shafts to slide into or out of the pockets 1200a,b,c.

The first side 1202a,b,c of each grip 108a,b,c includes a first aperture 1206a,b,c and the second side 1204a,b,c of each grip 108a,b,c includes a second aperture 1208a,b,c. Each first aperture 1206a,b,c is aligned with the corresponding second aperture 1208a,b,c. When the shafts 106a,b,c are received in the pockets 1200a,b,c, the apertures 1114a,b,c in the shafts 106a,b,c are aligned with and contiguous with the corresponding first apertures 1206a,b,c and second apertures 1208a,b,c, thereby defining volumes structured to receive the plugs 122a,b,c.

The first apertures 1206a,b,c are shown as being bigger than (e.g., larger volume or surface area, greater perimeters, longer, wider) than the second apertures 1208a,b,c. The first apertures 1206a,b,c are further shown as having a shape that substantially matches a shape of the apertures 1114a,b,c in the shafts 106a,b,c. The shape of each first apertures 1206a,b,c and plug 122a,b,c may be configured (e.g., shaped as oblong, oval, rectangle, etc.) to ensure that the plug can only be inserted in a desired/proper orientation. In addition, or alternatively, each first apertures 1206a,b,c can include a divot or projection configured to ensure that the plug 122a,b,c can only be inserted in a desired/proper orientation. Each second aperture is shown as including a narrower portion 1500a,b,c and a wider portion 1502a,b,c with the narrower portion 1500a,b,c positioned between the wider portion 1502 and the pocket 1200a,b,c. The narrower portion 1500a,b,c is narrower than the wider portion 1502a,b,c.

When assembled as shown in the cut-away views of FIGS. 15-17, each plug 122a,b,c fills (occupies volume within) the corresponding first aperture 1206a,b,c and second aperture 1208a,b,c, in the grip 108a,b,c and the aperture 1114a,b,c in the shaft 106a,b,c, thereby retaining the grip 108a,b,c on the shaft 106a,b,c (retaining the shaft 106a,b,c in the pocket 1200a,b,c). Each plug 122a,b,c includes a projection 1504a,b,c structured to extend through the narrower portion 1500a,b,c of the second aperture 1208a,b,c, with each projection 1504a,b,c having a lip 1506a,b,c which engages the second side 1204a,b,c of the grip 108a,b,c between the narrower portion 1500a,b,c and the wider portion 1502a,b,c. The lips 1506a,b,c can thereby retain the plugs 122a,b,c in the apertures 1206a,b,c/1208a,b,c/1114a,b,c.

The plugs 122a,b,c may be compressible under force from a user to be selectively inserted into the apertures 1206a,b,c/1208a,b,c/1114a,b,c and/or removed from the apertures 1206a,b,c/1208a,b,c/1114a,b,c. The plugs 122a,b,c thereby enable easy assembly of the handles 104a,b,c and/or disassembly of the handles 104a,b,c. For example, in some scenarios, users may desire to use or clean cookware without the grips 108a,b,c (e.g., to enable exposure of the cookware to higher temperature, to enable deep cleaning of the cookware, etc.). The teachings herein enable the grips 108a,b,c to be repeatedly installed by inserting a shaft 106a,b,c into a pocket 1200a,b,c and the inserting a plug 122a,b,c into the first apertures 1206a,b,c and second apertures 1208a,b,c of the grip 108a,b,c and into the aperture 1114a,b,c of the shaft 106a,b,c, and repeatedly uninstalled by removing the plug 122a,b,c from the apertures 1206a,b,c/1208a,b,c/1114a,b,c and then removing the shaft 106a,b,c from the pocket 1200a,b,c.

When received in the apertures 1206a,b,c/1208a,b,c/ 1114a,b,c, a ribbed surface 1510a,b,c of each plug 122a,b,c is aligned with an external surface 1512a,b,c of the corresponding first side 1202a of the grip 108a. The ribbed surfaces 1510a,b,c is thereby positioned to provide increased traction, friction, etc. between a user's thumb (or other part of a hand) and the handle 104a,b,c. Each plug 122a,b,c thereby provides both a ribbed thumb grip and retention of the grip 108a,b,c on the shaft 106a,b,c.

Figure 18:
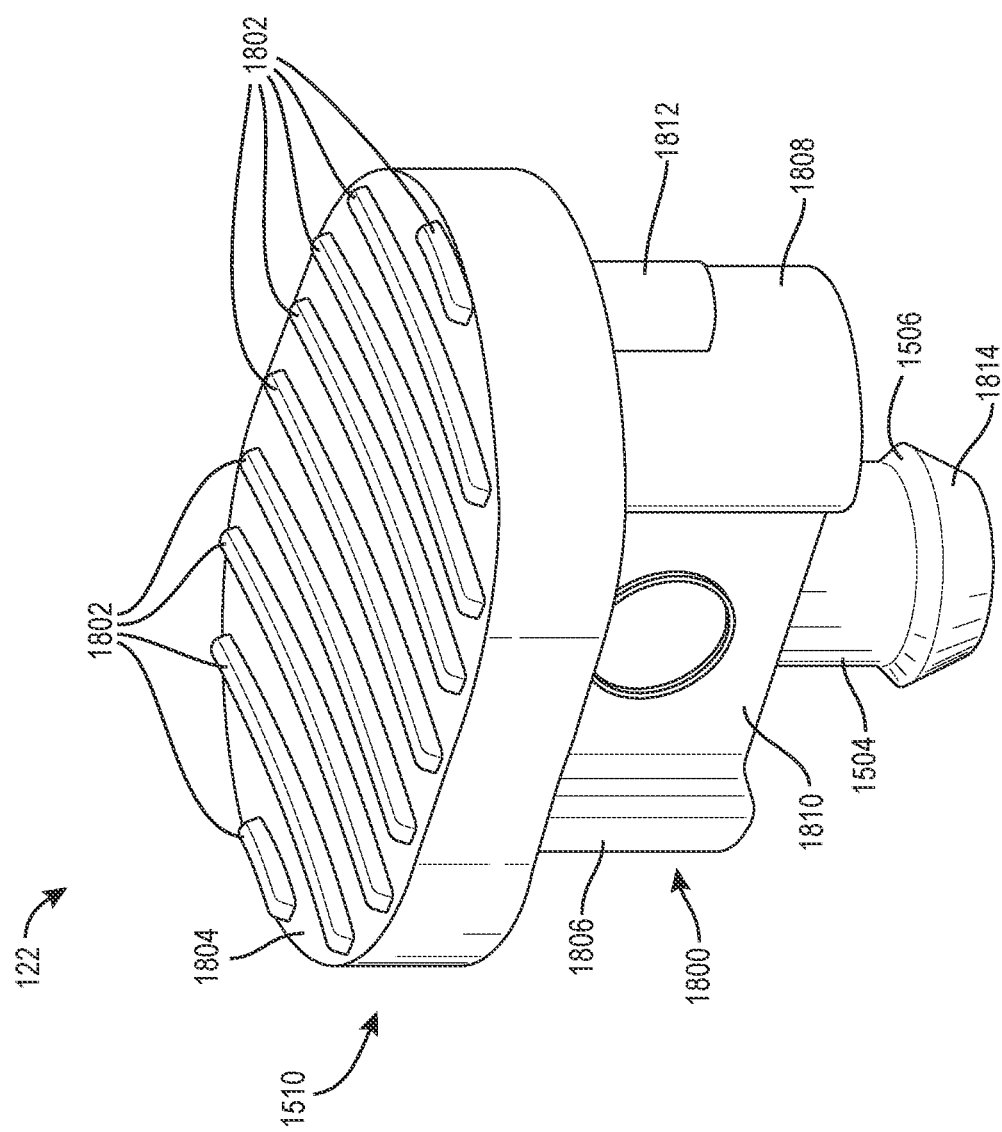
FIG. 18 is a perspective view of a plug of a cookware handle, according to some embodiments.
Figure 20:
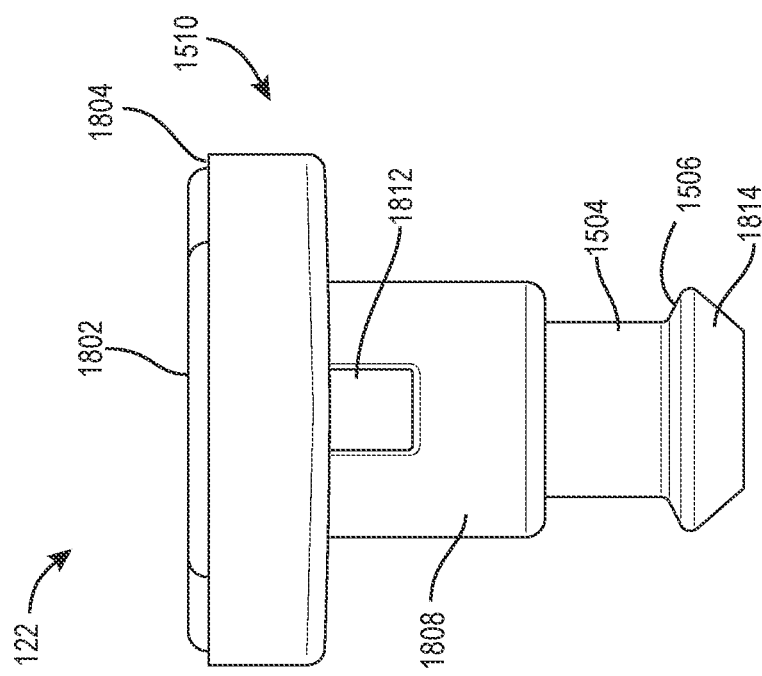
FIG. 20 is an end view of a plug of a cookware handle, according to some embodiments.
Figure 19:
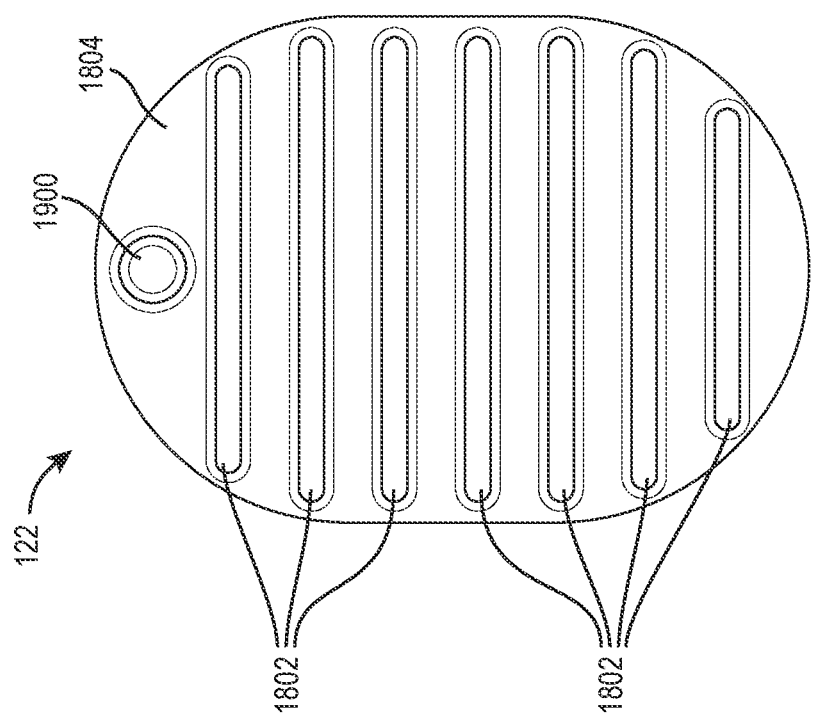
FIG. 19 is a top view of a plug of a cookware handle, according to some embodiments.
Figure 21:
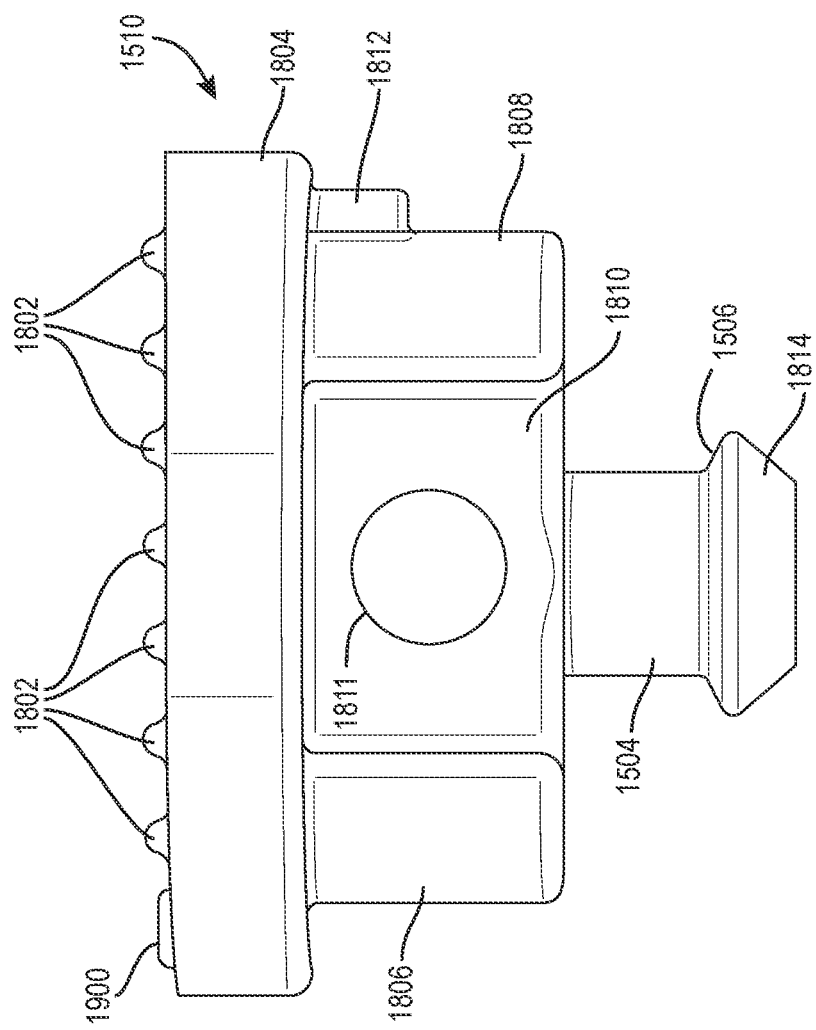
FIG. 21 is a side view of a plug of a cookware handle, according to some embodiments.

Referring now to FIGS. 18-20, views of a plug 122 are shown, according to some embodiments. The plug 122 may be any of the plugs 122a,b,c herein. The plug 122 is shown as including a ribbed surface 1510, a body 1800 extending from the ribbed surface 1510, and a projection 1504 extending from the body 1800 with the body 1800 between the ribbed surface 1510 and the projection 1504, The ribbed surface 1510 includes multiple ribs 1802 protruding from a base 1804. The base 1804 provides a planar or curved surface from which the ribs 1802 protrude, with each of the ribs 1802 extending laterally across the base 1804 and spaced apart longitudinally along the base 1804. Various numbers of ribs 1802 are included in various embodiments (e.g., six, seven, eight, nine, etc.). The body 1804 can be approximately oval shaped and may be sized and shaped to fit in (e.g., match) a portion of the first aperture 1206a,b,c such that the body 1804 is positioned in the first apertures 1206a,b,c when the handle 104 is assembled. As shown in FIG. 19, a dot 1900 (point, button, knob, etc.) can also protrude from the base 1804, for example at a similar height, etc. as the ribs 1802 but differentiated in length to provide an indication of directionality of the plug 122. In some embodiments, the dot 1900 provides a pivot point for a thumb of a user interacting with the ribbed surface 1510.

The body 1800 extends from the base 1804 in an opposite direction as the ribs 1802. As shown, the body 1800 may have a smaller cross-sectional area than the base 1804 but a greater thickness (in the direction of extension form the base 1804). The body 1800 is shown as including a first curved end piece 1806, a second curved end piece 1808 opposite the first curved end piece 1806, and a rectangular midsection 1810 extending between the first curved end piece 1806 and the second curved end piece 1808. The rectangular midsection 1810 has a width less than the diameters of the first curved end piece 1806 and the second curved end piece 1808 such that the rectangular midsection 1810 connects the first curved end piece 1806 and the second curved end piece 1808 while leaving some open space therebetween which can enable slight deformation of the body 1800 during insertion or removal of the plug 122 from the grip 108 and shaft 106. The first curved end piece 1806 and the second curved end piece 1808 are structured to fit snuggly against edges of the first apertures 1206a,b,c and the apertures 1114a,b,c. The rectangular midsection 1810 is shown as including a ring 1811 which may be an artifact of a molding process which forms the plug 122 as an unitary body.

The body 1800 is further shown as including a bump 1812 on the second curved end piece 1808. The bump 1812 is structured to interface with a recess included with any of the first apertures 1206a,b,c to ensure that the plug 122 is inserted in a particular desired orientation (e.g., with the bump 1812 extending towards the distal end 112, with the bump 1812 extending towards the proximal end 110). As shown, the bump 1800 is adjacent the ribbed surface 1510 and spaced apart from the projection 1504.

The projection 1504 includes a lip 1506 spaced apart from the body 1800. The lip 1506 is shown as being part of a tip 1814 of the projection 1504. The tip 1814 is shown as frustoconical (e.g., shaped as a portion of a cone) with a radius which decreases as the tip 1814 extends from the lip 1506 such that the tip 1814 has a tapered shape which can facilitate insertion of the projection 1504 through the second apertures 1208a,b,c.

The plug 122 is thereby formed to enable selective, easy (e.g., tool-free) insertion of the plug 122 into position relative to the grip 108 and the shaft 106 to retain the grip 108 on the shaft 106 as shown in FIGS. 1-3 and in the various other drawings herein. The plug 122 is also thereby adapted for selective, easy (E.g., tool-free) removal from such a position to enable removal of the grip 108 from the shaft 106, thereby enabling use of cookware 100 without the grip 108, cleaning of the cookware 100 separate from the grip 108, replacement of the grip 108 and/or the plug 122 (e.g., after routine wear-and-tear, etc.), and other advantageous use cases.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A cookware handle comprising:
   a grip comprising a first side, a second side, a pocket between the first side and the second side, a first aperture in the first side, and a second aperture in the second side;
   a shaft comprising a proximal end configured to be coupled to cookware, a distal portion positioned in the pocket of the grip, and a third aperture aligned with the first aperture and the second aperture of the grip;
   a plug comprising a ribbed thumb grip aligned with a surface of the first side of the grip, wherein the plug retains the grip on the shaft by filling the first aperture, the second aperture, and the third aperture.

2. The cookware handle of claim 1, wherein the third aperture is bigger than the second aperture, and wherein the plug comprises a body and a projection extending from the body, wherein the projection is positioned in the second aperture and the body is positioned in the second aperture.

3. The cookware handle of claim 2, wherein the projection comprises a tip extending out of the second aperture and comprising a lip configured to retain the plug in the first aperture, the second aperture, and the third aperture by engaging the second side.

4. The cookware handle of claim 1, wherein a shape of the first aperture ensures that the plug is received in the first aperture in a particular orientation.

5. The cookware handle of claim 1, wherein the grip is made of a thermally-insulating material.

6. The cookware handle of claim 1, wherein the plug is removable from the grip and the shaft, and wherein the grip is removable from the shaft when the plug is removed from the grip and the shaft.

7. The cookware handle of claim 1, further comprising an open channel extending through the grip and the shaft, the open channel spaced apart from the first aperture, the second aperture, and the third aperture.

8. Cookware comprising:
   a cooking vessel;
   a handle coupled to the cooking vessel, the handle comprising:
      a grip comprising a first side, a second side, a pocket between the first side and the second side, a first aperture in the first side, and a second aperture in the second side;
      a shaft comprising a proximal end at which the cooking vessel is coupled to the shaft, a distal portion positioned in the pocket, and a third aperture aligned with the first aperture and the second aperture;
      a plug comprising a ribbed thumb grip aligned with a surface of the first side of the grip, wherein the plug retains the grip on the shaft by filling the first aperture, the second aperture, and the third aperture.

9. The cookware of claim 8, wherein the third aperture is bigger than the second aperture, and wherein the plug comprises a body and a projection extending from the body, wherein the projection is positioned in the second aperture and the body is positioned in the second aperture.

10. The cookware of claim 9, wherein the projection comprises a tip extending out of the second aperture and comprising a lip configured to retain the plug in the first aperture, the second aperture, and the third aperture by engaging the second side.

11. The cookware of claim 8, wherein a shape of the first aperture ensures that the plug is received in the first aperture in a particular orientation.

12. The cookware of claim 8, wherein the grip is made of a thermally-insulating material.

13. The cookware of claim 8, wherein the plug is removable from the grip and the shaft, and wherein the grip is removable from the shaft when the plug is removed from the grip and the shaft.

14. The cookware of claim 8, wherein the handle further comprises an open channel extending through the grip and the shaft, the open channel spaced apart from the first aperture, the second aperture, and the third aperture.

15. The cookware of claim 8, wherein the proximal end of the shaft comprises a curved plate, wherein a first curvature of the curved plate matches a second curvature of the pot or pan.

16. The cookware of claim 8, wherein the shaft is bent at a corner between the proximal end and the grip.

17. A method comprising:
   providing a cooking vessel;
   coupling the cooking vessel to a shaft at a proximal end of the shaft;
   positioning a distal end of the shaft in a grip while aligning a first aperture in a first side of the grip and a second aperture in a second side of the grip with a third aperture in the shaft;
   inserting a plug into the first aperture, the second aperture, and the third aperture such that the plug retains the grip on the shaft and a ribbed thumb grip of the plug is aligned with a surface of the first side of the grip.

18. The method of claim 17, wherein inserting the plug comprises positioning a body of the plug in the third aperture and a projection from the body of the plug in the second aperture.

19. The method of claim 18, further comprising causing a lip of extending from the projection of the plug to engage the second side of the grip such that the plug is retained in the first aperture, the second aperture, and the third aperture.

20. The method of claim 17, further comprising:
   removing the plug from the shaft and the grip; and
   removing the shaft from the grip.

\* \* \* \* \*